United States Patent
Haley et al.

(10) Patent No.: US 10,571,978 B2
(45) Date of Patent: Feb. 25, 2020

(54) TECHNIQUES FOR REDUCING FAN CYCLING

(71) Applicant: NVIDIA CORPORATION, Santa Clara, CA (US)

(72) Inventors: David Haley, Beaverton, OR (US); Hans Schulze, Beaverton, OR (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/882,363

(22) Filed: Oct. 13, 2015

(65) Prior Publication Data
US 2017/0102744 A1   Apr. 13, 2017

(51) Int. Cl.
*G06F 1/20* (2006.01)
(52) U.S. Cl.
CPC .................... *G06F 1/206* (2013.01)
(58) Field of Classification Search
None
See application file for complete search history.

(56) References Cited

U.S. PATENT DOCUMENTS

| 6,996,441 B1 * | 2/2006 | Tobias | G05D 23/1919 165/104.33 |
| 2003/0011984 A1 * | 1/2003 | Chu | G06F 1/206 361/679.48 |
| 2006/0095796 A1 * | 5/2006 | Chotoku | G06F 1/206 713/300 |
| 2009/0167228 A1 * | 7/2009 | Chung | G05D 23/1917 318/455 |

* cited by examiner

*Primary Examiner* — Kenneth M Lo
*Assistant Examiner* — Istiaque Ahmed
(74) *Attorney, Agent, or Firm* — Artegis Law Group, LLP

(57) ABSTRACT

A fan control module configured to control the speed of a fan receives a signal that indicates the power used by a graphics processing unit (GPU) and a signal that indicates the GPU temperature. Whenever the GPU power exceeds a power threshold level, but the GPU temperature is below a temperature threshold level, the control module turns the fan on and causes the fan to operate at a minimum speed. Whenever the GPU temperature is above the temperature threshold, the control module causes the fan speed to increase with increasing temperature, regardless of power. The control module turns the fan off only when both the GPU temperature is below the temperature threshold and the GPU power is below the power threshold. Although the algorithm is discussed in conjunction with a GPU, the algorithm can be implemented with any type of processor or subsystem that needs to be fan-cooled.

19 Claims, 12 Drawing Sheets

TECHNIQUES FOR REDUCING FAN CYCLING

BACKGROUND OF THE INVENTION

Field of the Invention

Embodiments of the present invention relate generally to controlling the operating temperature of processors and, more specifically, to techniques for reducing fan cycling.

Description of the Related Art

In computer systems, in general, and with graphics processing units (GPUs) in particular, thermal management has become increasingly critical as processor technology has evolved. In particular, shrinking geometries of modern silicon processes afford higher density of switching transistors. Further, the increasing speed of operation in modern systems leads to increasing switching frequency of transistors. The power dissipated in a silicon device is proportional to the number of switching transistors and also to the switching frequency. Thus, as processor designs have advanced, power dissipation has increased, and attention to thermal management issues has become more paramount.

Computer systems typically include one or more mechanical fans to provide convection cooling of dissipating components. However, a fan that operates continuously can create an annoying environment for the user. To reduce this annoyance, some thermal management systems cause the fan to turn off when the temperature of the system is at a low enough level that cooling is not required. In such a thermal management system, the temperature at which the fan turns off (the "fan-off" temperature) should be lower than the temperature at which the fan turns on (the "fan-on" temperature) to avoid frequent cycling between "on" and "off" states.

One drawback of the above approach is the difficulty in determining an appropriate temperature range between the fan-on temperature and the fan-off temperature. If the difference between the fan-on temperature and the fan-off temperature is too small, then fan cycling can be more frequent, which, as alluded to above, can be annoying to the user. On the other hand, if the difference between the fan-on temperature and the fan-off temperature is too large, then the magnitude of the thermal cycling experienced by the electronic components in the system can increase, which can increase the thermal stresses on those components. Further, if the difference between the fan-on temperature and the fan-off temperature is too large, then the fan may not turn off when it otherwise could.

As the foregoing illustrates, what is needed in the art is a more effective technique for controlling fan operation when cooling a processor.

SUMMARY OF THE INVENTION

One embodiment of the present invention sets forth a computer-implemented method for controlling fan speed when cooling a processor, including receiving both a first signal that corresponds to a first power level of the processor and a second signal that corresponds to a first temperature level of the processor, responsive to determining the first temperature level is less than a first temperature threshold at which a fan is to be turned on but the first power level is greater than a first power threshold at which the fan is to be turned on, controlling the fan to operate at a predefined speed, responsive to determining the first temperature level is greater than the first temperature threshold, controlling the fan to operate based on the first temperature level, responsive to determining the first temperature level is less than a second temperature threshold at which the fan is to be turned off but the first power level is greater than a second power threshold at which the fan is to be turned off, controlling the fan to operate at the predefined speed, and responsive to determining the first temperature level is less than the second temperature threshold and the first power level is less than the second power threshold, controlling the fan to turn off.

One advantage of the disclosed approach is that by turning the fan on in response to an increase in power prior to an increase in temperature, a fan control module begins cooling in anticipation of an increase in temperature, affording a more graceful rise in temperature. In addition, by turning the fan off only when both temperature and power are below respective thresholds, the fan control module reduces the occurrence of fan cycling, thus reducing thermal stress on components and annoyance to the user.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
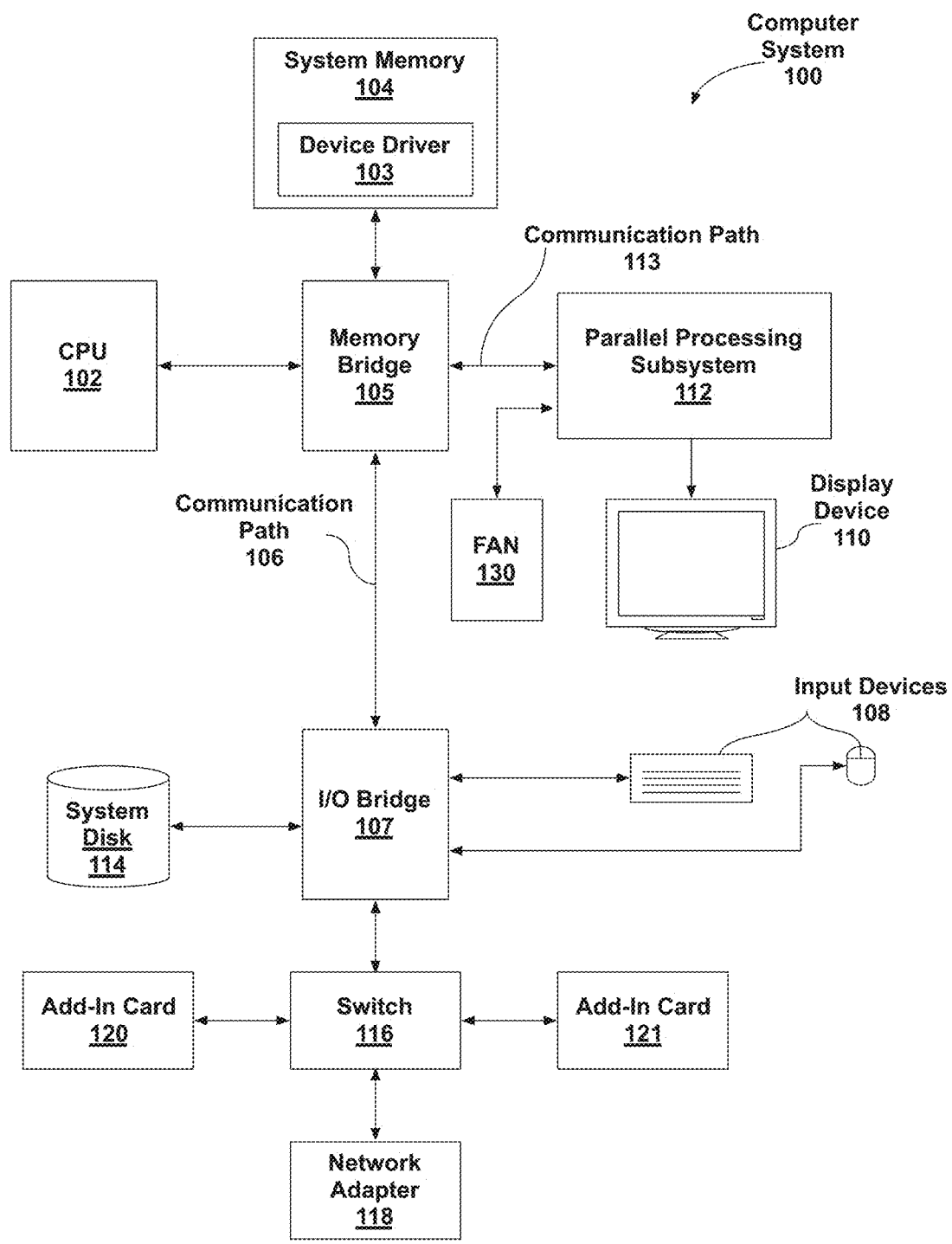
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

As also shown, parallel processing subsystem 112 is coupled to fan 130. In operation, fan 130 is configured to cool computer system 100, generally, and the processor(s) within parallel processing subsystem 112, specifically. As described in greater detail below the operation of fan 130 is controlled by a fan control module that is configured to implement a fan control algorithm that is more effective than prior art algorithms.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
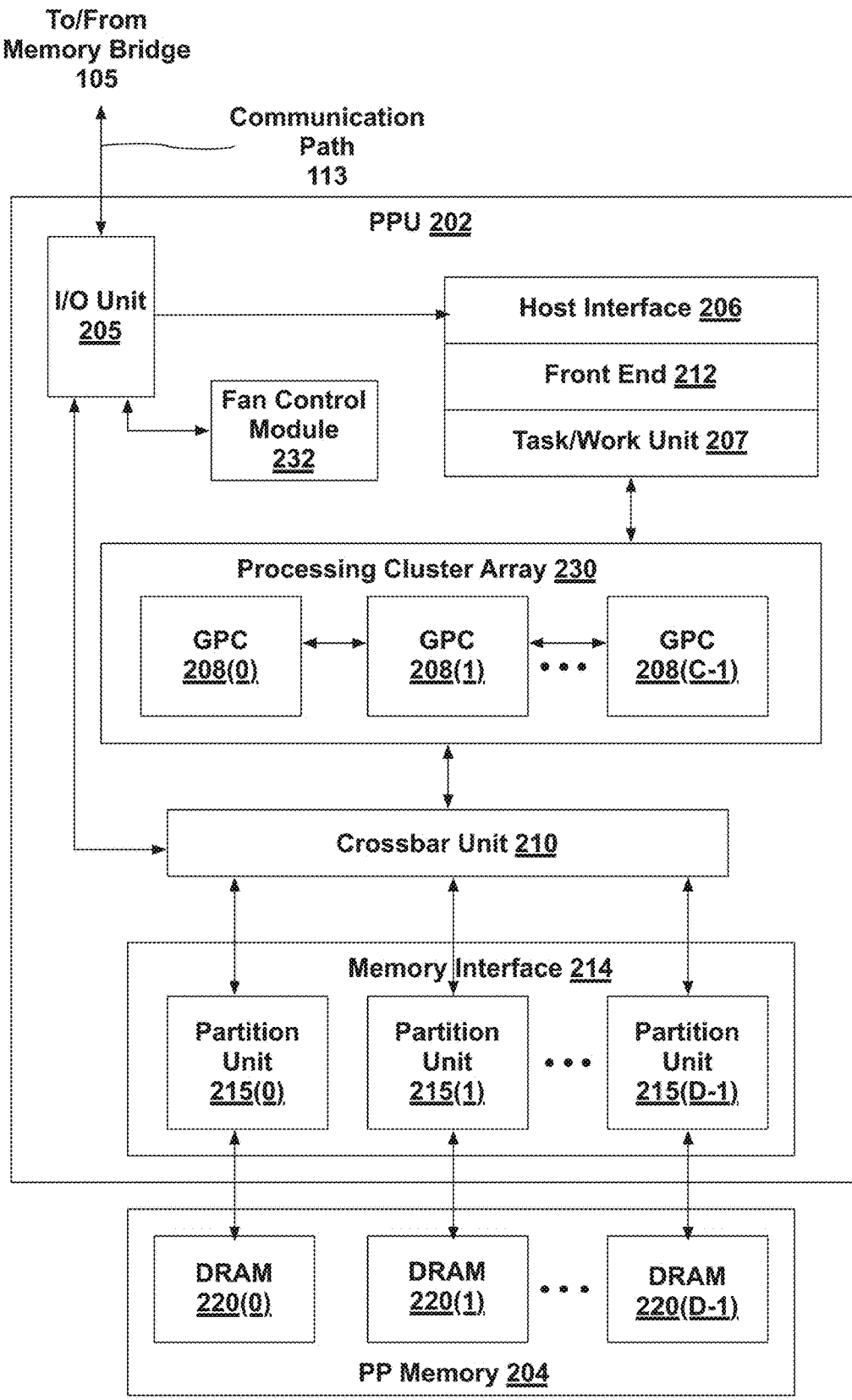
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As also shown, I/O unit 205 is further coupled to fan control module 232, which controls the operation of fan 120 of FIG. 1. Although fan control module 232 is illustrated as residing within PPU 202, the fan control algorithm implemented by fan control module 232 can be implemented in conjunction with any type of processor or subsystem that is fan-cooled. In such implementations, fan control module 232 may reside at any other technically appropriate location within computer system 100. Fan control module 232 may be implemented in hardware, in software, or in any combination of hardware and software. Fan control module 232 typically generates a pulse-width modulated voltage to control the power to the fan according to relationships between fan speed and GPU temperature and between fan speed and GPU power, as described in detail below in conjunction with FIGS. 5A-C. Fan control module 232, then, causes the fan to operate according to various states as described in detail below in conjunction with FIGS. 6A-C. The functionality of fan control module 232 is described in detail below in conjunction with FIG. 7.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Fan Control Prior Art

Figure 3:
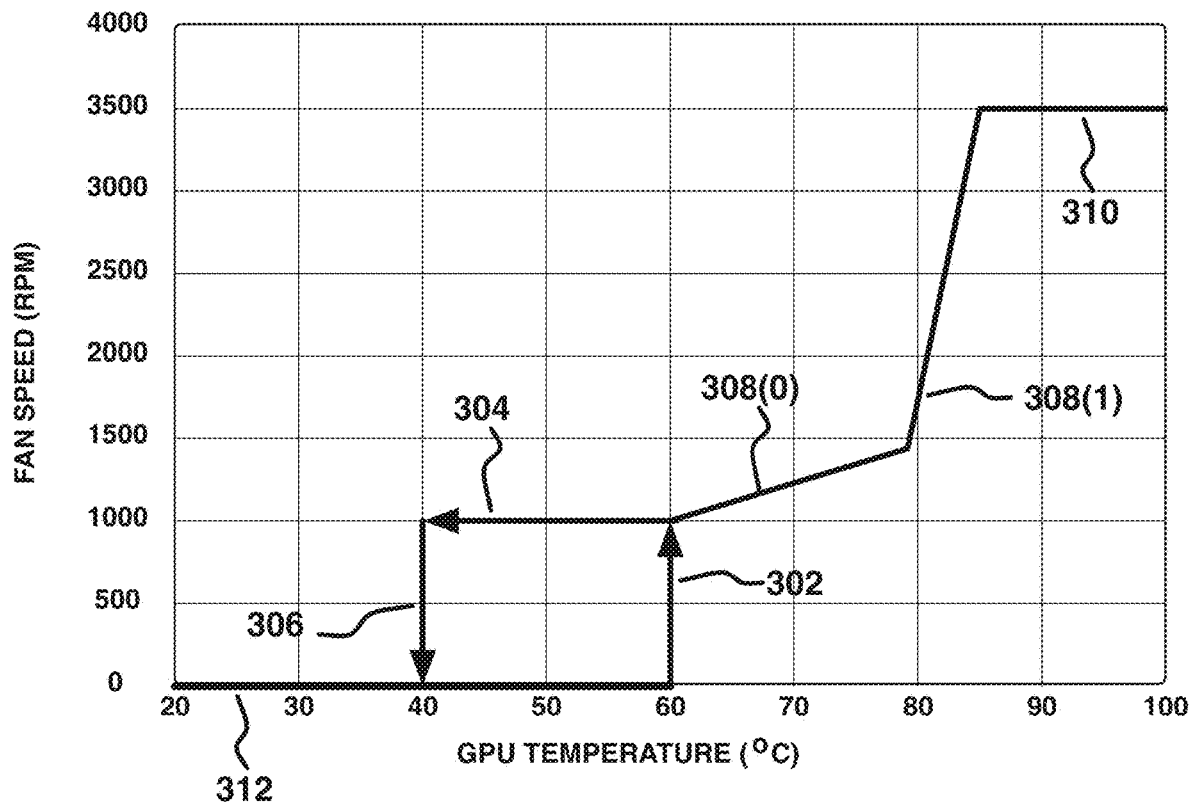
FIG. 3 illustrates the relationship between fan speed and GPU temperature, according to a prior art fan control algorithm.

FIG. 3 illustrates the relationship between fan speed and GPU temperature, according to a prior art fan control algorithm. As shown, the vertical axis represents the fan speed, and the horizontal axis represents the temperature of the GPU. Curve 302 indicates the point at which the fan turns on (the fan-on temperature). Curve 306 indicates the point at which the fan turns off (the fan-off temperature). The fan speed corresponding to curve 304 indicates the minimum speed of the fan. The fan speed corresponding to curve 310 indicates the maximum speed of the fan. Curve 312 represents a region in which the GPU temperature is below the fan-on temperature, so the fan is off.

Although the example of FIG. 3 shows specific numbers for the fan-on temperature, the fan-off temperature, the minimum fan speed, and the maximum fan speed, persons skilled in the art will understand that any values of threshold levels and fan speeds, and any combination of thresholds and speeds, are within the scope of the present invention.

In operation, power dissipated in the GPU may cause the GPU temperature to increase along curve 312 to the fan-on temperature (60 degrees C.). When the GPU temperature reaches the fan-on temperature, the fan speed ramps up along curve 302 to the minimum fan speed (1000 RPM).

If the cooling capacity of the fan at minimum speed is sufficient to cause the GPU temperature to decrease along curve 306 to the "fan-off temperature (40 degrees C.), the fan turns off. However, if the GPU power is at a level to cause the GPU temperature to increase along curve 302 to the fan-on temperature (60 degrees C.) when no cooling is applied, the fan, again, turns on at minimum speed (1000 RPM). The fan then cycles between turning on along curve 302, cooling along curve 304, and turning off along curve 306.

The fan operates in the on-off cycling mode as long as the GPU power remains at a level that the cooling capacity of the fan can cause the GPU temperature to decrease along curve 306 to the "fan-off temperature(40 degrees C.) at minimum speed (1000 RPM). As previously described herein, if the difference between the fan-on temperature and the fan-off temperature is too small, then fan cycling can be more frequent, which, as alluded to above, can be annoying to the user. On the other hand, if the difference between the fan-on temperature and the fan-off temperature is too large, then the thermal cycling experienced by the electronic components in the system can increase, which can increase the thermal stresses on those components.

If the cooling capacity of the fan at minimum speed is sufficient to cause the GPU temperature to decrease along curve 304, but not sufficient to cause the GPU temperature to decrease along curve 306 to the fan-off temperature (40 degrees C.), the fan remains operating at minimum speed (1000 RPM). The fan continues to operate at minimum speed as long as the GPU power remains at a level that the fan can cool at minimum speed without decreasing to the fan-off temperature along curve 306. The GPU temperature may then vary along curve 304.

If the GPU power is at a level to cause the GPU temperature to continue to increase above fan-on temperature 302 (60 degrees C.) when the fan is at minimum speed (1000 RPM), the GPU temperature rises along curve 308(0), and the fan speed increases along curve 308(0) until reaching the intersection of curve 308(0) and curve 308(1) (78 degrees C. and 1400 RPM). As the GPU temperature continues to increase, the fan speed increases along curve 308(1) until reaching the intersection of curve 308(1) and curve 310 (85 degrees C.), at which point the fan reaches maximum fan speed (3500 RPM). The transition from minimum fan speed (1000 RPM) to maximum fan speed (3500 RPM) is illustrated as two linear segments, along curve 308(0) and along curve 308(1). Persons skilled in the art will realize that curve 308(0) and curve 308(1) are illustrative only and that any curve may be implemented, for example, without limitation, a linear curve, an exponential curve, or a stepwise curve.

Figure 4:
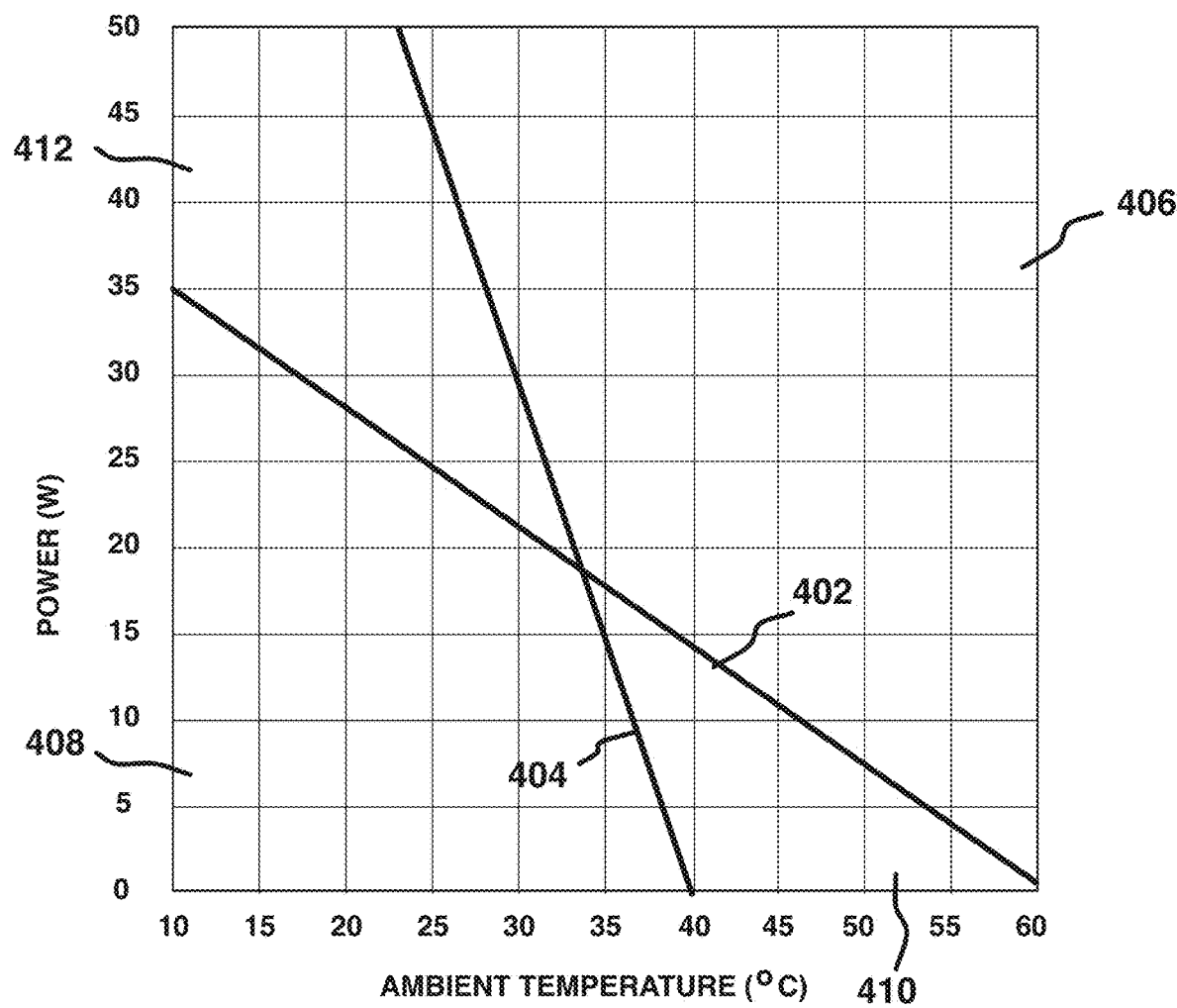
FIG. 4 is a state diagram for a fan resulting from the fan control algorithm illustrated in FIG. 3.

FIG. 4 is a state diagram for a fan resulting from the fan control algorithm illustrated in FIG. 3. As shown, the vertical axis represents GPU power, and the horizontal axis represents ambient temperature. Curve 402 indicates the lower boundary line of power and temperature conditions that cause the fan to turn on, that is, cause the GPU temperature to exceed the fan-on temperature. Curve 404 indicates the upper boundary line of power and temperature conditions that cause the fan to turn off, that is, cause the GPU temperature to be less than the "fan-off" temperature. As further shown, each of regions 406, 408, 410, and 412 are bounded by curves 402 and 404.

Region 406 lies above the lower boundary line of curve 402 and above the upper boundary of curve 404. Therefore, for all points in region 406, the GPU temperature is above the fan-on temperature and not below the fan-off temperature. Consequently, the fan is always on in region 406. Referring to FIG. 3, the GPU temperature in region 406 lies to the right of curve 302, and the fan speed follows curve 308(0), curve 308(1), or curve 310.

Region 408 lies below the lower boundary line of curve 402 and below the upper boundary of curve 404. Therefore, for all points in region 406, the GPU temperature is below the fan-off temperature and not above the fan-on temperature. Consequently, the fan is always off in region 408. Referring to FIG. 3, the fan speed in region 408 follows curve 312 to the left of curve 306.

Region 410 lies below the lower boundary line of curve 402 and above the upper boundary of curve 404. Therefore, for all points in region 406, the GPU temperature is above the fan-off temperature and not above the fan-on temperature. Consequently, the fan is on in region 408. Referring to FIG. 3, the GPU temperature in region 410 lies to the left of curve 302, and to the right of curve 306. In region 410, the cooling capacity of the fan at minimum speed is insufficient to cause the GPU temperature to decrease below the fan-off temperature. The fan continues to operate at minimum speed as long as the GPU power remains at a level where the fan can sufficiently cool the GPU while operating at minimum speed. The fan speed follows curve 304.

Region 412 lies above the lower boundary line of curve 402 and below the upper boundary of curve 404. When the GPU temperature is in region 408, in which the fan is off, if the GPU temperature rises so as to enter to region 412, the fan turns on. However, fan cooling in region 412 is sufficient to cause the GPU temperature to decrease to the fan-off temperature. The fan then turns off. On the other hand, when the GPU temperature is in region 4406, in which the fan is on, if the GPU temperature decreases so as to enter to region 412, the fan turns off. However, fan cooling in region 412 is insufficient to cause the GPU temperature to remain below the fan-on temperature. The fan then turns on. Consequently, the fan cycles between an on-state and an off-state in region 412.

Referring to FIG. 3, when the GPU temperature in region 412 exceeds curve 302, on the fan turns on. The cooling capacity of the fan at minimum speed is sufficient to cause the GPU temperature to decrease below the fan-off temperature, and the fan turns off. However, given the operating state of the GPU, the GPU power is sufficient to cause the GPU temperature to increase again to the fan-on temperature, causing the fan to turn on again at minimum speed. In this fashion, when in region 412, the fan continually cycles between turning on at curve 302, cooling along curve 304, turning off at curve 306, and heating along curve 312.

The rate of cycling in region 412 is determined by the GPU temperature difference between fan-on temperature 302 (60 degrees C.) and fan-off temperature 306 (40 degrees C.), ambient temperature, and the GPU power. Higher power levels result in more frequent cycling, as the GPU temperature increases at a faster rate. Lower ambient temperatures also result in more frequent cycling, as the GPU temperature decreases at a faster rate. Consequently, the rate of cycling occurs at low ambient temperatures and high power levels. If the difference in GPU temperature between fan-on temperature 302 and fan-off temperature 306 is increased by system design, then the thermal cycling experienced by the electronic components in the system can increase, which can increase the thermal stresses on those components. On the other hand, if the difference in GPU temperature between fan-on temperature 302 and fan-off temperature 306 is reduced by system design, then fan cycling can be more frequent, which, as alluded to above, can be annoying to the user.

Technique for Reducing Fan Cycling

To address the drawbacks of over-cycling and thermal cycles that are too large that can arise with conventional fan algorithms, as described above in conjunction with FIGS. 3 and 4, various embodiments of the invention are directed towards an improved technique for controlling fan speed that mitigates these issues. FIGS. 5A-8 set forth the details of that technique.

Figure 5A:
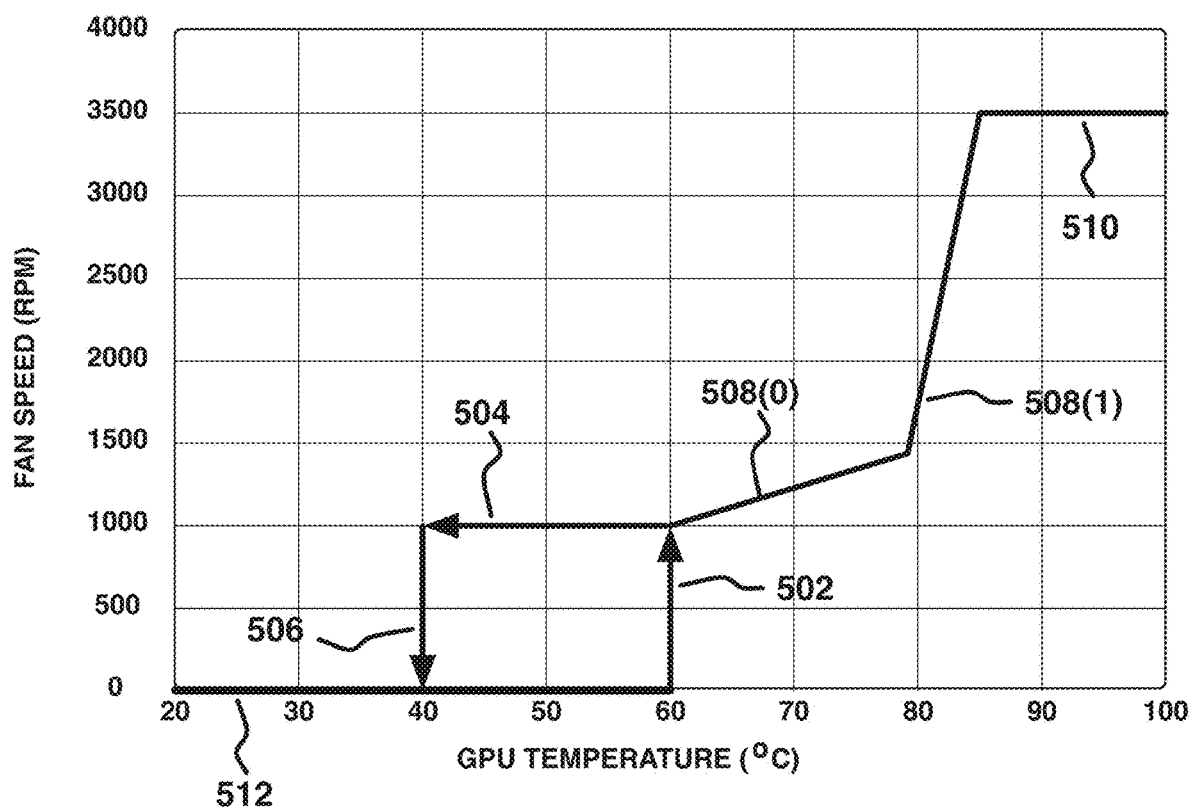
FIG. 5A illustrates the relationship between fan speed and GPU temperature, according to various embodiments of the present invention.

FIG. 5A illustrates the relationship between fan speed and GPU temperature, according to various embodiments of the present invention. As shown, the vertical axis represents the fan speed, and the horizontal axis represents the temperature of the GPU. Curve 502 indicates the point at which the fan turns on (the fan-on temperature). Curve 506 indicates the point at which the fan turns off (the fan-off temperature). The fan speed corresponding to curve 504 indicates the minimum speed of the fan. The fan speed corresponding to curve 510 indicates the maximum speed of the fan. Curve 512 represents a region in which the GPU temperature is below the fan-on temperature, so the fan is off.

Although the example of FIG. 5A shows specific numbers for the fan-on temperature, the fan-off temperature, the minimum fan speed, and the maximum fan speed, persons skilled in the art will understand that any values of threshold levels and fan speeds, and any combination of thresholds and speeds, are within the scope of the present invention.

As previously described herein, in operation, power dissipated in the GPU may cause the GPU temperature to increase along curve 512 to the fan-on temperature (60 degrees C.). When the GPU temperature reaches the fan-on temperature, fan control module 232 applies power to the fan such that the fan speed ramps up along curve 502 to the minimum fan speed (1000 RPM).

If the cooling capacity of the fan at minimum speed is sufficient to cause the GPU temperature to decrease along curve 504, but not sufficient to cause the GPU temperature to decrease along curve 506 to the fan-off temperature (40 degrees C.), the fan remains operating at minimum speed (1000 RPM). The fan continues to operate at minimum speed as long as the GPU power remains at a level that the fan can cool at minimum speed without decreasing to the fan-off temperature (40 degrees C.) along curve 506. The GPU temperature may then vary along curve 504.

If the GPU power is at a level to cause the GPU temperature to continue to increase above fan-on temperature 502 (60 degrees C.) when the fan is at minimum speed (1000 RPM), the GPU temperature rises along curve 508(0), and fan control module 232 increases the fan speed along curve 508(0) until reaching the intersection of curve 508(0) and curve 508(1) (78 degrees C. and 1400 RPM). As the GPU temperature continues to increase, fan control module 232 increases the fan speed along curve 508(1) until reaching the intersection of curve 508(1) and curve 510 (85 degrees C.), at which point the fan reaches maximum fan speed (3500 RPM). The transition from minimum fan speed (1000 RPM) to maximum fan speed (3500 RPM) is illustrated as two linear segments, along curve 508(0) and along curve 508(1). Persons skilled in the art will realize that curve 508(0) and curve 508(1) are illustrative only and that any curve may be implemented, for example, without limitation, a linear curve, an exponential curve, or a stepwise curve.

If the cooling capacity of the fan at minimum speed is sufficient to cause the GPU temperature to decrease along curve 506 to the fan-off temperature (40 degrees C.), fan control module 232 causes the fan to return to the off state by virtue of the GPU temperature. However, as described in greater detail below in conjunction with FIG. 5B, fan control module 232 introduces a dependency of the fan speed on GPU power.

Figure 5B:
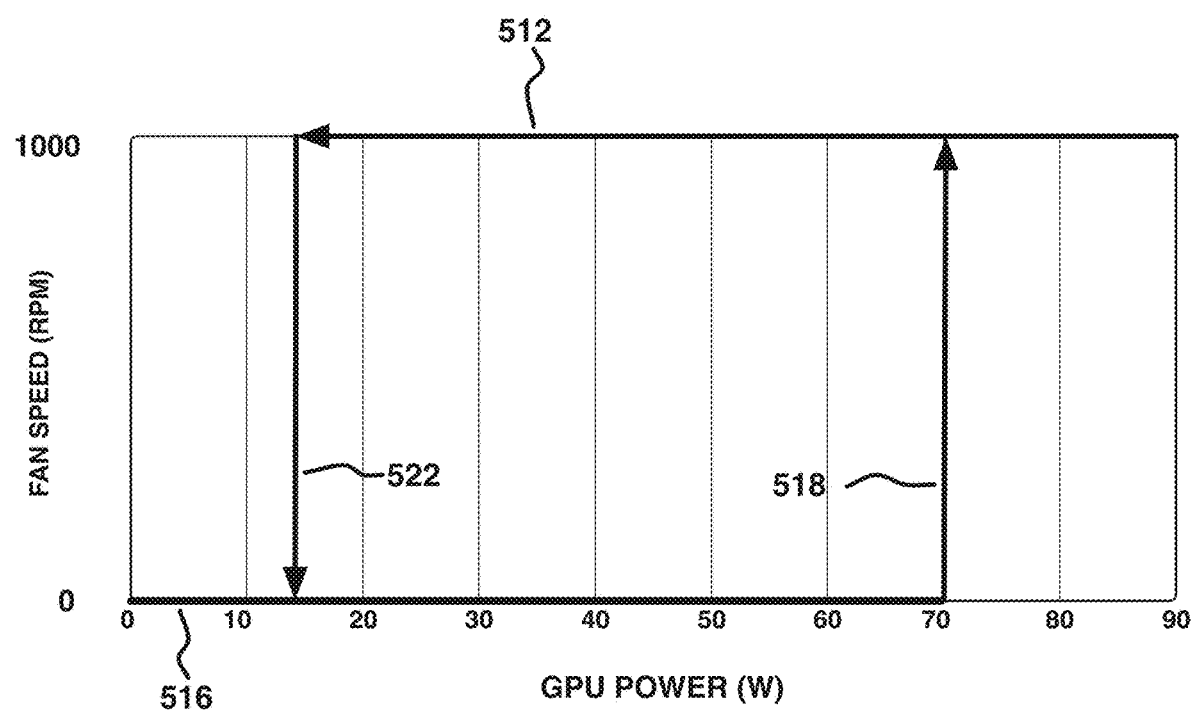
FIG. 5B illustrates the relationship between fan speed and GPU power, according to various embodiments of the present invention.

FIG. 5B illustrates the relationship between fan speed and GPU power, according to various embodiments of the present invention. As shown, the vertical axis represents the fan speed, and the horizontal axis represents the power dissipated in the GPU. Curve 518 indicates the point at which the fan turns on, the fan-on power (70 Watts). Curve 522 indicates the point at which the fan turns off, the fan-off power (15 Watts). Curve 512 indicates the minimum operating speed of the fan (1000 RPM). Curve 516 represents a region in which the GPU temperature is below the fan-on temperature and the GPU power is less than the fan-on power, so the fan is off.

Although the example of FIG. 5B shows specific numbers for the fan-on power, the fan-off power, and the minimum fan speed, persons skilled in the art will understand that any values of threshold levels and fan speeds, and any combination of thresholds and speeds, are within the scope of the present invention.

If the GPU power increases from zero Watts along curve 516, fan control module 232 causes the fan to be off. If the GPU power increases along curve 516 to the fan-on power (70 Watts), fan control module causes the fan speed to ramp up to minimum speed (1000 RPM) along curve 518. If the GPU power decreases along curve 512, fan control module 232 causes the fan to remain at minimum speed. If the GPU power decreases further along curve 512 to the fan-off power (15 Watts), fan control module 232 removes power to the fan, and the fan turns off. Further, if the GPU power increases along curve 512, fan control module 232 causes the fan to remain at minimum speed. However, fan control module 232 combines the power dependence with the temperature dependence, as described above in conjunction with FIG. 5A, to implement an improved fan control algorithm as described in detail below in conjunction with FIG. 5C.

Figure 5C:
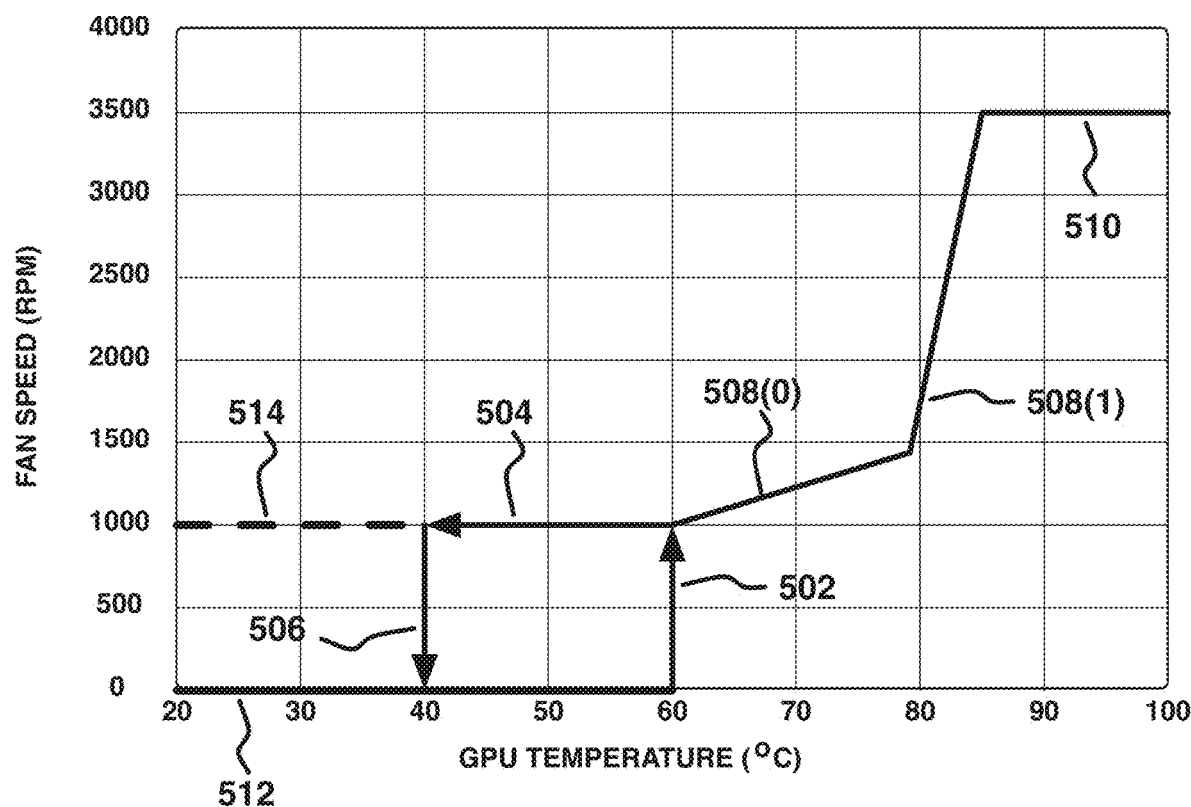
FIG. 5C illustrates the relationship between fan speed, GPU temperature, and GPU power, according to various embodiments of the present invention.

FIG. 5C illustrates the relationship between fan speed, GPU temperature, and GPU power, according to various embodiments of the present invention. As shown, the vertical axis represents the fan speed, and the horizontal axis represents the temperature of the GPU. Curve 502 indicates the point at which the fan turns on (the fan-on temperature). Curve 506 indicates the point at which the fan turns off (the fan-off temperature). The fan speed corresponding to curve 504 indicates the minimum speed of the fan. The fan speed corresponding to curve 510 indicates the maximum speed of the fan. Curve 512 represents a region in which the GPU temperature is below the fan-on temperature, so the fan is off. Curve 514 represents a region in which the GPU temperature is below the fan-on temperature, but in which the GPU power has not decreased below the fan-off power.

As previously described herein, in operation, power dissipated in the GPU may cause the GPU temperature to increase along curve 512 to the fan-on temperature (60 degrees C.). When the GPU temperature reaches the fan-on temperature, fan control module 232 controls the fan such that the fan speed ramps up along curve 502 to the minimum fan speed (1000 RPM). However, if, when the GPU temperature is less than the fan-on temperature, and the GPU power increases above the fan-on power (70 Watts), fan control module 232 controls the fan such that the fan operates at minimum speed. Thus, by implementing a dependence on both temperature and power, fan control module 232 turns the fan on in anticipation of an increase in temperature that will result from the measured increase in power. As long as the GPU temperature remains less than the fan-on temperature and the GPU power remains greater than the fan-off power (15 Watts), fan control module 232 maintains power to the fan such that the fan remains operating at minimum speed.

If the cooling capacity of the fan at minimum speed is sufficient to cause the GPU temperature to decrease along curve 504 to the fan-off temperature (40 degrees C.), the fan state is determined by the power dissipated in the GPU. When the GPU power is greater than the fan-off power, GPU temperature decreases along curve 514, and the fan remains on at minimum speed. When the GPU power is less than the fan-off power level, the fan speed and GPU temperature decrease along curve 512, and the fan remains off. Thus, the fan turns off only when both the GPU temperature is less than the fan-on temperature (40 degrees C.) and the power is below the fan-off power.

In summary, if the GPU power is at a level that is sufficient to cause the GPU temperature to increase, fan control module 232 determines that the cooling capacity of the fan is required and applies power to the fan. Thus, even if the GPU temperature decreases to less than the fan-off temperature, the fan remains operating as long as the GPU power is greater than the fan-off power. By performing the fan control algorithm, described in detail below in conjunction with FIG. 8, fan control module 232 eliminates fan cycling associated with repeated transitions along curve 504 between fan-on temperature, along curve 502, and fan-off temperature, along curve 506. Further, by determining an increase in GPU power to anticipate an increase in GPU temperature, fan control module 232 cause the temperature to rise in a slower and more graceful manner.

Figure 6A:
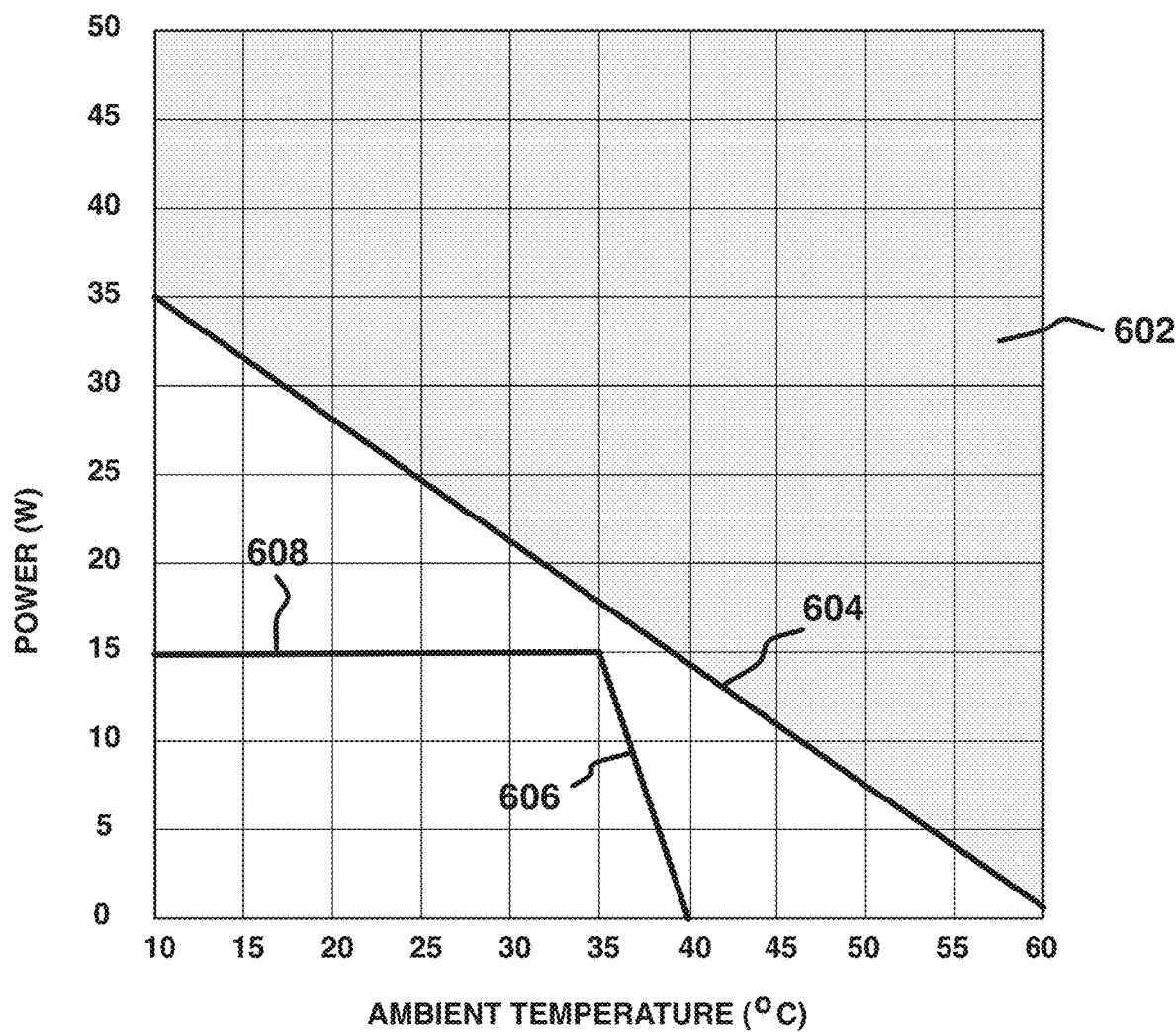
FIGS. 6A-6C illustrate a state diagram for a fan resulting from the fan control algorithm illustrated in FIGS. 5A-5B, according to various embodiments of the present invention.
Figure 6B:
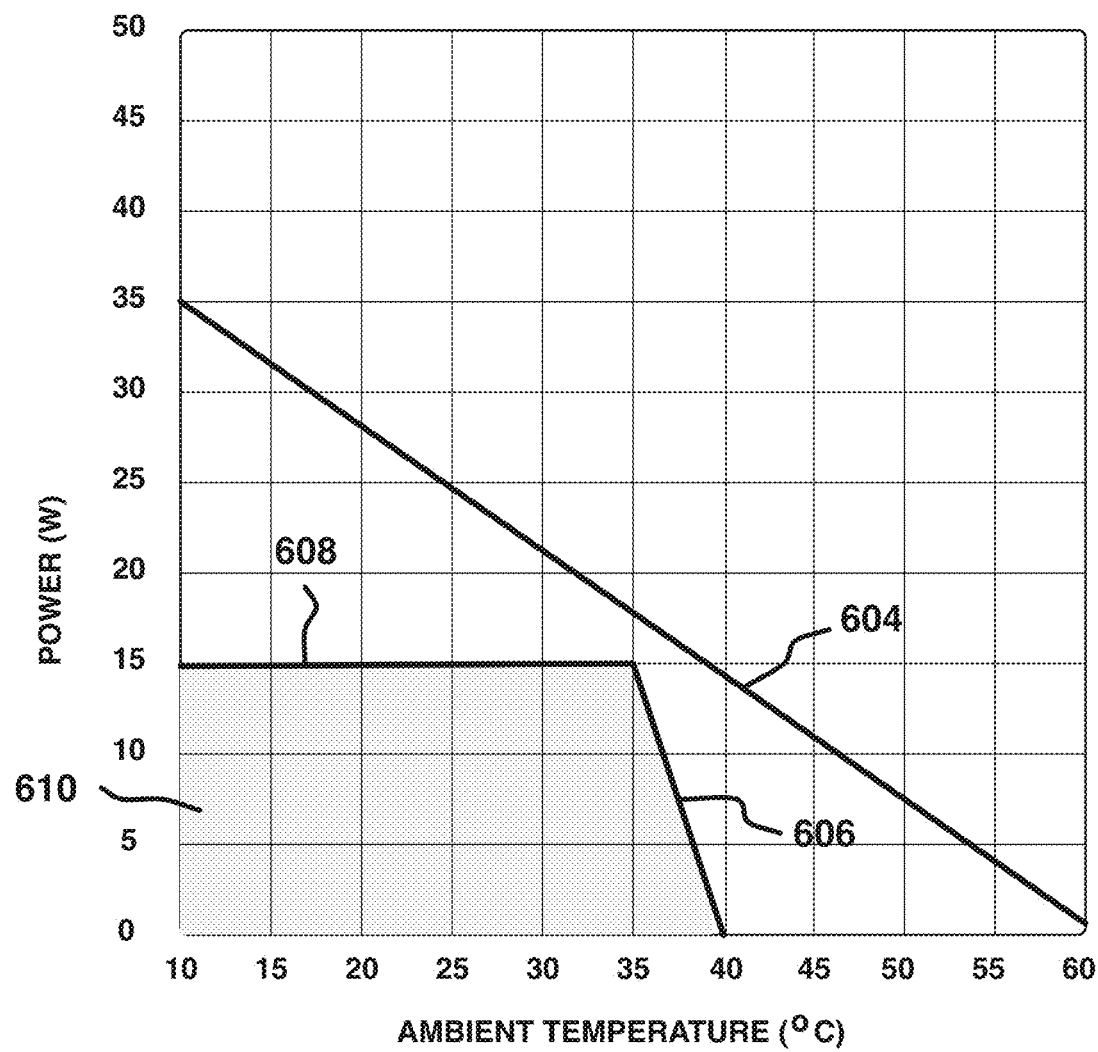
Figure 6C:
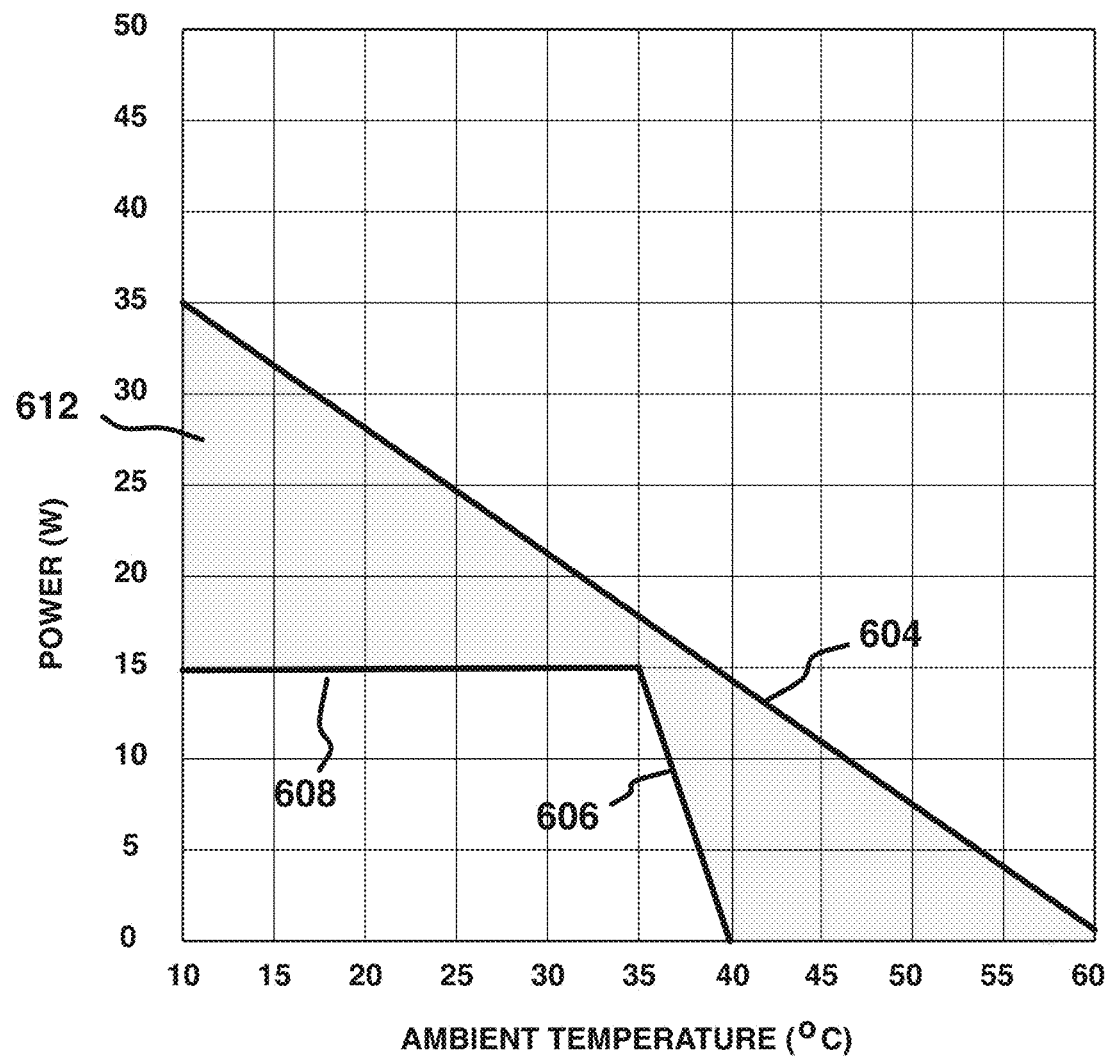

FIGS. 6A-6C illustrate a state diagram for a fan resulting from the fan control algorithm illustrated in FIGS. 5A-5C, according to various embodiments of the present invention. As shown in FIGS. 6A-6C, the vertical axis represents GPU power, and the horizontal axis represents ambient temperature. Curve 604 indicates the lower boundary line of power and temperature conditions that cause the fan to turn on, that is, cause the GPU temperature to exceed the fan-on temperature. Curve 606 indicates the upper boundary line of GPU temperature that causes the fan to turn off when GPU power is less than the fan-on power. Curve 608 indicates the lower boundary line of GPU power that causes the fan to turn on.

Referring specifically now to FIG. 6A, in shaded region 602, three scenarios may occur during operation. In the first scenario, the GPU power may increase above the fan-on power, as shown in FIG. 5B, and the GPU temperature may be less than the fan-on temperature, as shown in FIG. 5A. Therefore, in this first scenario, fan control module 232 applies power to the fan such that the fan operates at minimum speed. In the second scenario, the GPU temperature may increase above the fan-on temperature, as shown in FIG. 5A, and the GPU power may be less than the fan-on power, as shown in FIG. 5B. Therefore, in this second scenario, fan control module 232 applies power to the fan such that the fan operates at a speed that increases with increasing GPU temperature. In the third scenario, the GPU temperature may increase above the fan-on temperature, as shown in FIG. 5A, and the GPU power may increase above the fan-on power, as shown in FIG. 5B. Therefore, in this third scenario, fan control module 232 applies power to the fan such that the fan operates at a speed that increases with increasing GPU temperature.

In summary, in region 602, fan control module 232 always applies power to the fan, and the GPU temperature determines the fan speed. A change in GPU temperature or GPU power may cause a transition from region 602 to a region 612, which is described below in conjunction with FIG. 6C.

Referring specifically now to FIG. 6B, in shaded region 610, the GPU temperature is less than the fan-on temperature, as shown in FIG. 5A and the GPU power is less than the fan-on power, as shown in FIG. 5B. Therefore, in region 610, fan control module 232 applies zero power to the fan, and the fan is off. Thus, the fan is off only when both GPU temperature and GPU power are less than respective threshold levels. An increase in either GPU temperature or GPU power may cause a transition from region 610 to a region 612, which is described below in conjunction with FIG. 6C.

Referring specifically now to FIG. 6C, in shaded region 612, two scenarios may occur. In the first scenario, the GPU power is above the fan-on power, as shown in FIG. 5B, and the GPU temperature is less than the fan-off temperature, as shown in FIG. 5A. Therefore, in in this first scenario, fan control module 232 applies power to the fan such that the fan operates at a minimum speed. A reduction in GPU power may cause a transition to region 610, in which the fan is turned off, by crossing curve 608, as described above in conjunction with FIG. 6B. An increase in GPU temperature may cause a transition to a region 602 by crossing curve 604. In region 602, fan control module 232 applies power to the fan such that the fan operates at a speed that increases with increasing GPU temperature, as described above in conjunction with FIG. 6A.

Again, referring specifically now to FIG. 6C, in the second scenario, the GPU power is less than the fan-on power, as shown in FIG. 5B, and the GPU temperature is above the fan-off temperature, as shown in FIG. 5A. Therefore, in this second scenario, fan control module 232 applies power to the fan such that the fan operates at a speed determined by the GPU temperature. A reduction in GPU temperature may cause a transition to region 610, in which the fan is turned off, by crossing curve 606, as described above in conjunction with FIG. 6B. An increase in GPU power may cause a transition to a region 602 by crossing curve 604. In region 602, fan control module 232 applies power to the fan such that the fan operates at a speed that increases with increasing GPU temperature, as described above in conjunction with FIG. 6A.

Figure 7:
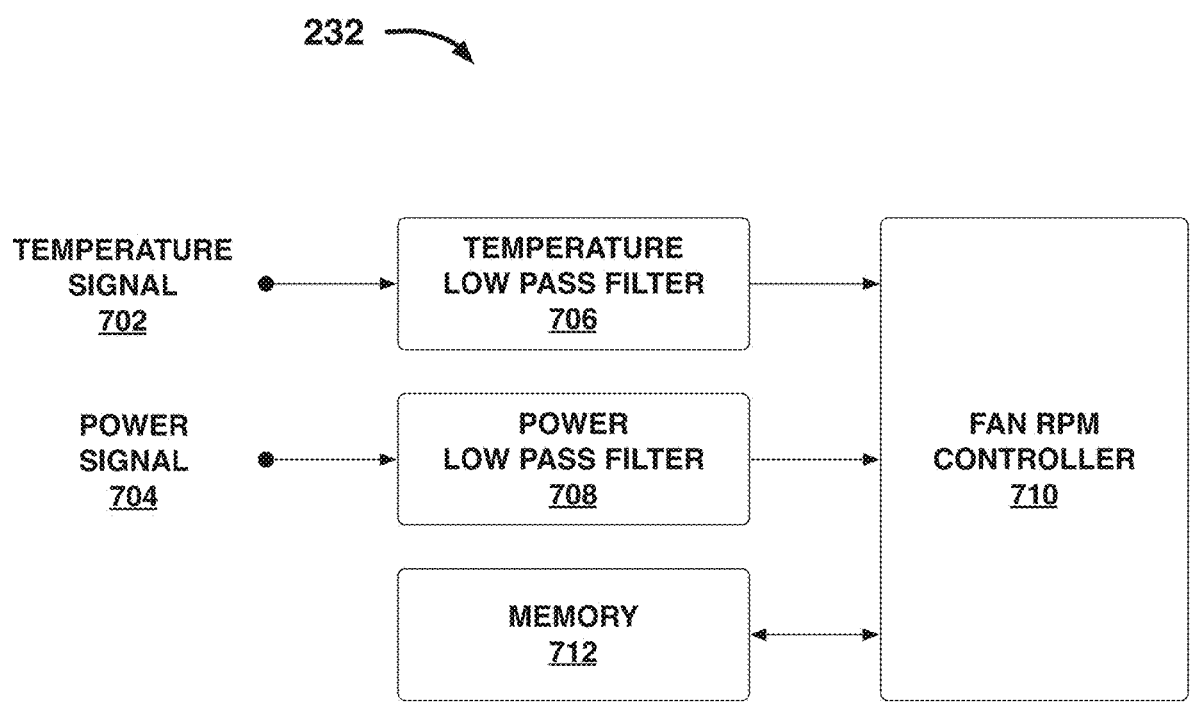
FIG. 7 is a more detailed block diagram of the fan control module of FIG. 2, according to various embodiments of the present invention.

FIG. 7 is a more detailed block diagram of the fan control module 232 of FIG. 2, according to various embodiments of the present invention. As shown, fan control module 232 includes, without limitation, temperature low pass filter 706 coupled to fan RPM controller 710. Further, power low pass filter 708 is coupled to fan control module 232. As further shown, fan RPM controller is coupled to memory 712.

In operation, temperature low pass filter 706 receives a signal that represents the GPU temperature. Temperature variations typically occur slowly in time. Temperature low pass filter 706 smooths out fluctuations and noise that may occur in the temperature signal and couples the filtered signal to fan RPM controller 710. Power low pass filter 708 receives a signal that represents the GPU power. System power may occur on an instantaneous time scale. Power low pass filter 708 couples a clean signal to fan RPM controller 710.

Fan RPM controller 710 receives filtered temperature signal from temperature low pass filter 706 and filtered power signal from power low pass filter 708. When the GPU temperature is greater than the fan-on temperature, fan RPM controller 710 supplies power to the fan, as described in detail above in conjunction with FIG. 5A. Further, when the GPU power is greater than the fan-on power, fan RPM controller 710 supplies power to the fan, as described in detail above in conjunction with FIG. 5A.

Memory 712 stores curves 502, 504, 506, 508, 510, 512, and 514 that determine the relationship between fan speed and GPU temperature, as described in detail above in conjunction with FIG. 5A. Memory 712 further stores curves 516, 518 and 522 that determine the relationship between fan speed and GPU power, as described in detail above in conjunction with FIG. 5B. Memory 712 may store the curves illustrated in FIGS. 5A-B as, for example, without limitation, equations, look-up tables, discrete pairs, or any other format and in any technically feasible manner. Fan RPM controller 710 accesses the curves illustrated in FIGS. 5A-B, in whatever format, and implements a fan control algorithm, as described in detail below in conjunction with FIG. 8, to determine the fan power to supply that causes the fan to operate at a speed determined by GPU temperature signal 702 and GPU power signal 704.

Figure 8:
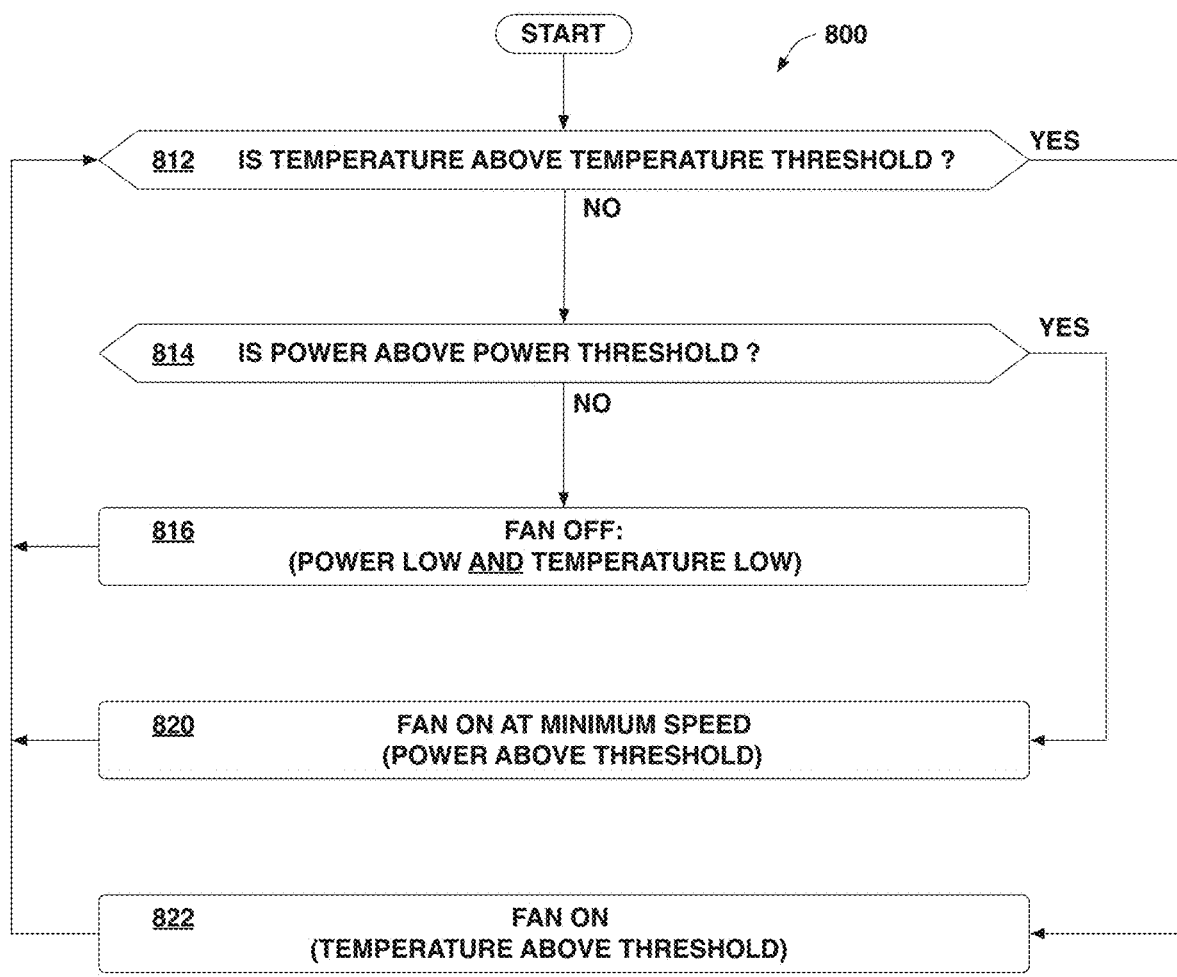
FIG. 8 is a flow diagram of method steps for controlling fan speed when cooling a processor, according to various embodiments of the present invention.

FIG. 8 is a flow diagram of method steps for controlling fan speed when cooling a processor, according to various embodiments of the present invention. Although the method steps are described in conjunction with the systems of FIGS. 1-7, persons skilled in the art will understand that any system configured to perform the method steps, in any order, is within the scope of the various embodiments.

As shown, a method 800 begins at step 812, where fan control module 232 determines if the GPU temperature is above the fan-on temperature. If fan control module 232 determines that the GPU temperature is not above the fan-on temperature, then the method proceeds to step 814.

At step 814, fan control module 232 determines if the GPU power is above the fan-on power. If fan control module 232 determines that the GPU power is not above the fan-on power, then the method proceeds to step 816. At step 816, fan control module 232 turns the fan off. The method then returns to step 812, where fan control module 232 reassesses temperature and power status.

Returning now to step 814, if fan control module 232 determines that the GPU power is above the fan-on power, then the method proceeds to step 820. At step 820, fan control module 232 turns on the fan at minimum speed. The method then returns to step 812, where fan control module 232 reassesses temperature and power status.

Returning now to step 812, if fan control module 232 determines that the GPU temperature is above the fan-on temperature, the method proceeds to step 822. At step 822, fan control module 232 turns the fan on in a mode in which the GPU temperature determines the fan speed. The method then returns to step 812 where fan control module 232 reassesses temperature and power status. In operation, fan control module 232 continually executes method 800 to maintain proper cooling for the GPU or other subsystem within computer system 100.

In sum, a fan control module configured to control the speed of a fan receives a signal that indicates the power used by a GPU and a signal that indicates the GPU temperature. Whenever the power used by the GPU exceeds a power threshold level, but the GPU temperature is below a temperature threshold level, the fan control module turns the fan on and causes the fan to operate at a minimum speed. Whenever the GPU temperature is above the temperature threshold level, the fan control module causes the fan speed to increase with increasing temperature, regardless of power level. The fan control module turns the fan off only when both the GPU temperature is below the temperature threshold level and the power used by the GPU is below the power threshold level. Although the algorithm is discussed in conjunction with a GPU, the algorithm can be implemented with any type of processor or subsystem within a computer that needs to be fan-cooled.

At least one advantage of the techniques described herein is that, by turning the fan on in response to an increase in power prior to an increase in temperature, the fan control module begins cooling in anticipation of an increase in temperature. Thus, the fan control module affords a more graceful rise in temperature, which reduces thermal stress on system components, thereby enhancing system reliability, and, further, results in performance benefits for algorithms that boost clock speed while below temperature limits. In addition, by turning the fan off only when both temperature and power are below respective thresholds, the fan control module reduces the occurrence of fan cycling, as described in detail above in conjunction with FIG. 5C. Reducing the occurrence of fan cycling reduces thermal cycling of system components, further enhancing system reliability. Further, reducing the occurrence of fan cycling reduces annoyance to the user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for controlling fan speed when cooling a processor, the method comprising:
   receiving both a first signal that corresponds to a first power level of the processor and a second signal that corresponds to a first temperature level of the processor;
   responsive to determining the first temperature level is less than a first temperature threshold at which a fan is to be turned on but the first power level is greater than a first power threshold at which the fan is to be turned on, controlling the fan to operate at a predefined speed;
   responsive to determining the first temperature level is greater than the first temperature threshold, controlling the fan to operate based on the first temperature level;
   responsive to determining the first temperature level is less than a second temperature threshold at which the fan is to be turned off but the first power level is greater than a second power threshold at which the fan is to be turned off, controlling the fan to operate at the predefined speed; and
   responsive to determining the first temperature level is less than the second temperature threshold and the first power level is less than the second power threshold, controlling the fan to turn off.

2. The computer-implemented method of claim 1, wherein the first power level is greater than the first power threshold when the first temperature level is determined to be greater than the first temperature threshold.

3. The computer-implemented method of claim 1, further comprising:
   smoothing the first signal based on a power low pass filter; and
   smoothing the second signal based on a temperature low pass filter.

4. The computer-implemented method of claim 1, wherein the first power level is less than the first power threshold when the first temperature level is determined to be greater than the first temperature threshold.

5. The computer-implemented method of claim 1, further comprising:
   receiving both a third signal that corresponds to a second power level of the processor, and a fourth signal that corresponds to a second temperature level of the processor; and
   controlling the fan to operate based on both the third signal and the fourth signal.

6. The computer-implemented method of claim 5, wherein:

the first power level is greater than the first power threshold;

the second power level is less than the second power threshold;

the second temperature level is greater than the first temperature threshold; and controlling the fan to operate based on the third and the fourth signals comprises controlling the fan to operate based on the second temperature level.

7. The computer-implemented method of claim 5, wherein:

the first power level is greater than the first power threshold;

the second power level is greater than the second power threshold;

the second temperature level is less than the second temperature threshold; and controlling the fan to operate based on the third and the fourth signals comprises controlling the fan to operate at the predefined speed.

8. The computer-implemented method of claim 5, wherein:

the first power level is greater than the first power threshold;

the second power level is less than the second power threshold;

the second temperature level is less than the second temperature threshold; and controlling the fan to operate based on the third and the fourth signals comprises controlling the fan to turn off.

9. A computer system, comprising:

a memory; and a controller coupled to the memory that:
 receives both a first signal that corresponds to a first power level of a processor and a second signal that corresponds to a first temperature level of the processor,
 responsive to determining that the first temperature level is less than a first temperature threshold at which a fan is to be turned on but the first power level is greater than a first power threshold at which the fan is to be turned on, controlling the fan to operate at a predefined speed,
 responsive to determining the first temperature level is greater than the first temperature threshold, controlling the fan to operate based on the first temperature level,
 responsive to determining the first temperature level is less than a second temperature threshold at which the fan is to be turned off but the first power level is greater than a second power threshold at which the fan is to be turned off, controlling the fan to operate at the predefined speed, and
 responsive to determining the first temperature level is less than the second temperature threshold and the first power level is less than the second power threshold, controlling the fan to turn off.

10. The computer system of claim 9, wherein the memory stores:

a plurality of relationships between fan speed and processor temperature; and a plurality of relationships between fan speed and processor power.

11. The computer system of claim 9, wherein the controller further:

receives both a third signal that corresponds to a second power level of the processor, and a fourth signal that corresponds to a second temperature level of the processor; and controls the fan to operate based on both the third signal and the fourth signal.

12. The computer system of claim 11, wherein:

the first power level is greater than the first power threshold;

the second power level is greater than the second power threshold;

the second temperature level is less than the second temperature threshold; and the controller controls the fan to operate based on the third and the fourth signals by controlling the fan to operate at the predefined speed.

13. The computer system of claim 11, wherein:

the first power level is less than the first power threshold;

the second power level is less than the second power threshold;

the second temperature level is less than the second temperature threshold; and the controller controls the fan to operate based on the third and the fourth signals by controlling the fan to turn off.

14. The computer system of claim 11, wherein:

the first power level is greater than the first power threshold;

the second power level is less than the second power threshold;

the second temperature level is less than the second temperature threshold; and the controller controls the fan to operate based on the third and the fourth signals by controlling the fan to turn off.

15. The computer system of claim 9, wherein the first power level is greater than the first power threshold when the first temperature level is determined to be greater than the first temperature threshold.

16. The computer system of claim 9, wherein the first power level is less than the first power threshold when the first temperature level is determined to be greater than the first temperature threshold.

17. One or more non-transitory computer-readable media storing instructions that, when executed by one or more processors, cause the one or more processors to control fan speed by performing the steps of:

receiving both a first signal that corresponds to a first power level of a first processor or another processor, and a second signal that corresponds to a first temperature level of the processor or the another processor;

responsive to determining that the first temperature level is less than a first temperature threshold at which a fan is to be turned on but the first power level is greater than a first power threshold at which the fan is to be turned on, transitioning to a first state in which the first processor controls the fan to operate at a predefined speed;

responsive to determining the first temperature level is greater than the first temperature threshold, transitioning to a second state in which the first processor controls the fan to operate based on the first temperature level;

responsive to determining the first temperature level is less than a second temperature threshold at which the fan is to be turned off but the first power level is greater than a second power threshold at which the fan is to be turned off, transitioning to the first state in which the first processor controls the fan to operate at the predefined speed; and responsive to determining the first temperature level is less than the second temperature threshold and the first power level is less than the second power threshold, transitioning to a third state in which the first processor controls the fan to turn off.

18. The one or more non-transitory computer-readable media of claim 17, wherein the first power level is less than the first power threshold when the first temperature level is determined to be greater than the first temperature threshold.

19. The one or more non-transitory computer-readable media of claim 17, further storing:

a plurality of relationships between fan speed and processor temperature; and a plurality of relationships between fan speed and processor power.

* * * * *